United States Patent [19]
Irukulla et al.

[11] Patent Number: 4,718,032
[45] Date of Patent: Jan. 5, 1988

[54] METHOD AND APPARATUS FOR EFFECTING RANGE TRANSFORMATION IN A DIGITAL CIRCUITRY

[75] Inventors: Suren Irukulla, Holliston; Bimal V. Patel, Framingham, both of Mass.

[73] Assignee: Prime Computer, Inc., Natick, Mass.

[21] Appl. No.: 701,573

[22] Filed: Feb. 14, 1985

[51] Int. Cl.$^4$ .............................................. G06F 7/52
[52] U.S. Cl. .................................... 364/765; 364/764; 364/761
[58] Field of Search ................ 364/765, 764, 761, 754

[56] References Cited

U.S. PATENT DOCUMENTS

| | | | |
|---|---|---|---|
| 3,648,038 | 3/1972 | Sierra | 364/765 |
| 3,777,132 | 12/1973 | Bennett, Jr. | 364/765 |
| 3,828,175 | 8/1974 | Amdahl et al. | 364/765 |
| 3,917,935 | 11/1975 | Lazecki | 364/761 |
| 4,364,115 | 12/1982 | Asai | 364/765 |

FOREIGN PATENT DOCUMENTS 0076844  6/1981  Japan .................... 364/765

OTHER PUBLICATIONS

Svoboda, "An Algorithm for Division," *Information Processing Machines*, No. 9, 1963, pp. 25–32.
Nandi and Krishnamurthy, "A Simple Technique for Digital Division," Communications of the ACM, vol. 10, No. 5, May, 1967, pp. 299–301.
Ferrari, "A Division Method Using a Parallel Multiplier", IEEE Transactions on Electronic Computers, Apr. 1967, pp. 224–226.
Hemel, "Making Small ROM's do Math Quickly, Cheaply and Easily", Electronics, May 1970, pp. 104–111.
Stefanelli, "Binary Read–Only–Memory Dividers", Alta Freguenza, vol. 48, No. 11, Nov. 1979, Italy.

*Primary Examiner*—Gary V. Harkcom
*Assistant Examiner*—Long T. Nguyen
*Attorney, Agent, or Firm*—Wolf, Greenfield & Sacks

[57] ABSTRACT

A range transformation method for transforming the normalized divisor in a division calculation to a range wherein the transformed value differs from one by no more than the quantity $2^{-n}$. The method and apparatus generate the transform multiplier value from a first high order "q" digits of the divisor and generate an out-of-range indicator signal from at least those same digits. The thus generated multiplier value is modified in response to the out-of-range indicator signal when an out-of-range condition is indicated. The apparatus employs a read-only-memory for enabling the generation of the transform multiplier value without requiring either large table look-up storage or multiplicative functions. As a result, various division methods requiring an initial transformation to provide a divisor which approaches one in value can be efficiently implemented.

22 Claims, 6 Drawing Figures

| K | D | |
|---|---|---|
| (K · 128) | ($\frac{1}{K} \cdot 512$) | ($\frac{127}{128} \cdot \frac{1}{K} \cdot 512$) |
| 196 | 334.3672 | 331.7551 |
| 197 | 332.6700 | 330.0710 |
| 198 | 330.9899 | 328.4040 |
| 199 | 329.3266 | 326.7537 |
| 200 | 327.6800 | 325.1200 |

METHOD AND APPARATUS FOR EFFECTING RANGE TRANSFORMATION IN A DIGITAL CIRCUITRY

BACKGROUND OF THE INVENTION

The invention relates generally to implementing division methods and apparatus, and in particular to a method and apparatus for implementing the range transformation for division methods in a data processor.

In a data processor, the most time consuming mathematical calculation is division. In order to increase the speed of the division process, some division methods employ a multiplicative technique to converge the divisor towards unity, thus making the dividend converge toward the quotient. These methods are based on a Newton-Raphson method and have the property of quadratic convergence. For example, the IBM model 360/91 computer uses such a technique.

According to this method, the numerator (N) (the dividend) and the denominator (D) (the divisor) of a fraction are each multiplied by a suitable constant "K" so that the denominator has one of the following forms:

1.00000**0XXX
0.11111**1XXX.

Thus, as the denominator approaches one, the numerator will approach the quotient. In accordance with the method, the process can be iterated so that for each subsequent iteration, the number of leading ones or zeros in the denominator fractional portion doubles (or nearly doubles) depending upon the choice of each new "K" which is a function of the new denominator.

There is another class of division methods developed, for example, by Svoboda, and by Krishnamurthi, in which the first method step is similar to the Newton-Raphson method. Thus, according to this second method, the numerator and denominator are multiplied by a constant to place the denominator into one of the two forms noted above. Thereafter, a restoring or non-restoring higher radix division can be performed. If there are "n" leading ones or zeros, a radix of $2^n$ can be employed. Each successive quotient digit in that radix then becomes a simple transformation of the most significant bits of the then current partial remainder. An improvement of this method is described in copending U.S. application Ser. No. 701,556, filed Feb. 14, 1985 and assigned to the asignee of this invention.

Both of the above-described methods therefore require an efficient method and apparatus for transforming the original denominator, D, into its desired form. Typically, either a brute force table look-up approach has been employed, wherein the value of D is used to determine the multiplicative product transform value K or an iterative approach, wherein two leading digits are employed to find a value K which, after multiplication, will add an additional "one" or "zero" in the transformed denominator, is used. These methods, however, are either expensive (in hardware requirements) or slow.

It is therefore an object of the invention to efficiently transform a normalized denominator into a form for use with a division method requiring range transformed coefficients. Other objects of the invention are a low cost, reliable hardware circuitry for effecting a transform of the divisor for use in the above-described division techniques.

SUMMARY OF THE INVENTION

The invention relates therefore to a range transformation method and apparatus for transforming the divisor D of a division calculation, the divisor D having a normalized representation, to a range transformed value X where the magnitude of (X−1) is less than the quantity $2^{-n}$. The method features the steps of generating at least one transform multiplier value K from a first high order "q" bits of D, generating an out-of-range indicator signal from at least the "q" bits of D for indicating an out-of-range condition, and modifying the multiplier K in response to the out-of-range indicator signal when an out-of-range condition is indicated.

In particular embodiments, the method features the steps of employing a look-up table for generating the transform multiplier value K wherein K has a precision of "p" bits and wherein "q" satisfies the equation:

$$(n+2) \leq q \leq 2n;$$

and
where p=n.

In accordance with the range transformation method, there is further featured the steps of employing a look-up table for generating the out-of-range indicator signal in response to at least the q digits of the divisor D, and changing the value of K by a selected, predetermined, incremental value whenever the out-of-range indication is received. The incrementing value can be either positive or negative depending on the particular method for selecting "K".

One method for determining the out-of-range signal performs a multiplication of the provided multiplier value K and the divisor D and increments K in its least significant digit(s) when the muliplicative product, X, is out of the allowable transform range. In this instance, K is assumed to have the precision noted above, of "p" bits, and it is the low order "a" bits of K which must be changed as described in more detail hereinafter.

In another particular aspect of the invention, the method features the steps of generating an interval division location value for dividing into subintervals each of a plurality of equal intervals covering the allowable range of the normalized divisor. The method further features responding to the interval divisor location value and a plurality of yet less significant digits of the divisor D for generating the out-of-range indicator signal.

Specific hardware can be provided for both generating the out-of-range indicator signal and for acting in response thereto. In particular, the look-up table can be stored in a read only memory (ROM) which has means for generating in response to the "n" bits of the divisor both the value "K" and a second value, "K'", differing from "K" only in its "y" low order bits. The apparatus and method then employ the out-of-range indicator signal, generated from both the lower order bits of the divisor and the interval divisor location for selecting between the first and second generated values, K and K'.

In another aspect, the apparatus of the invention features circuitry for generating at least one transfer multiplier value K from a first high order "q" digits of a divisor D, circuitry for generating an out-of-range indicator signal from at least the q digits of D, and further circuitry for modifying the provided multiplier value K in response to the out-of-range indicator signal when an out-of-range condition is obtained.

DESCRIPTION OF THE DRAWINGS

Other features, advantages, and objects of the invention will become apparent from the following description, taken together with the drawings, in which.

DESCRIPTION OF A PARTICULAR PREFERRED EMBODIMENTS

In accordance with the invention, it is desired to find an efficient method and apparatus for transforming the denominator or divisor, D, of a fraction so that the resulting transformed divisor D' approaches the value one while the numerator or dividend approaches the quotient of the division. More precisely, given N/D where N is the dividend or numerator and D is the divisor or denominator, the object of the invention is to find a transform multiplier value K so that:

$$\frac{N \cdot K}{D \cdot K} = \frac{N'}{D'} = \frac{N'}{0.111\text{---}1XXX} \quad \text{(Equation 1)}$$

Alternatively, K can have a value so that the transformation of the divisor D has the following form:

$$\frac{N \cdot K}{D \cdot K} = \frac{N'}{D'} = \frac{N'}{1.0000\text{---}0XXX} \quad \text{(Equation 2)}$$

In either instance, the denominator approaches the value of 1 and the transform value K is such that the magnitude of $(D'-1)$ is less than $2^{-n}$. This is equivalent to saying, that in Equation 1, D' has n ones following the decimal point while in Equation 2, D' has n zeros following the decimal point.

In the explanation which follows, we will consider the instance of Equation 1 wherein D' has the form of a zero followed by n ones. A corresponding explanation and description can be employed in connection with the denominator transformation of Equation 2.

In accordance with Equation 1 therefore, the value of K must satisfy the following equations:

$$D \cdot K < 1 \quad \text{(Equation 3)}$$

$$D \cdot K \geq 0.1111\text{---}1 \text{ (where there are n 1's)} \quad \text{(Equation 4)}$$

or $$D \cdot K \geq (1 - 2^{-n}) \quad \text{(Equation 4a)}$$

or $$D \cdot K \geq (2^n - 1)/2^n \quad \text{(Equation 4b)}$$

Equations 4 and 4b can be rewritten to provide a bound on K as follows:

$$(2^n - 1)/(2^n \cdot D) \leq K < 1/D \quad \text{(Equation 5)}$$

Figure 2:
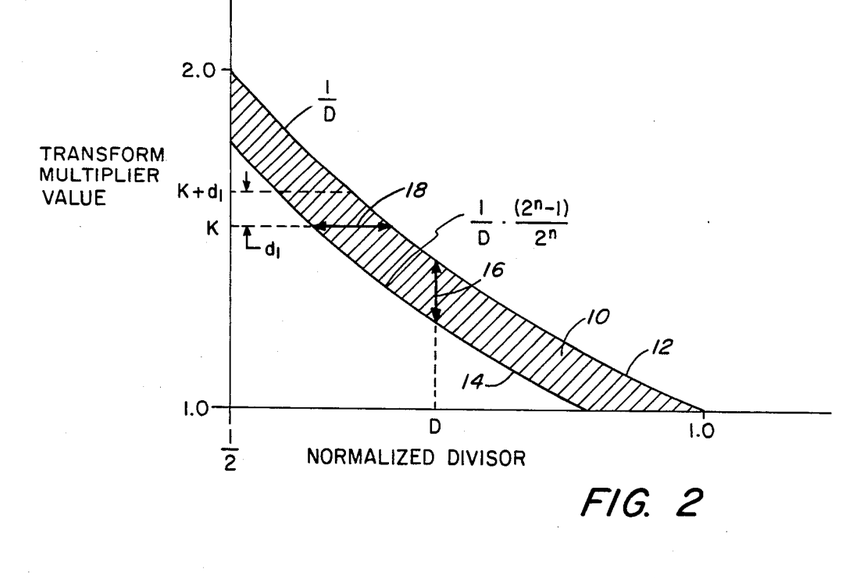
FIG. 2 is a representative diagrammatic representation of the limits imposed upon the transform in accordance with one aspect of the invention.

Consider now that D is in a binary normalized form. That is, D is greater than or equal to one-half, but less than one. Then, using the bound on K provided by Equation 5, a plot showing the allowable values of D and K can be created. Referring to FIG. 2, for each D between one-half and one, the value of K is bounded (in a range 16) between the upper curve 12, $K = 1/D$ and the lower curve 14, $K = (2^n - 1)/(D \cdot 2^n)$. Thus, K must lie within the cross-hatched region labeled 10. Correspondingly, then, for a given value of K, there is a range 18 of D, defined between the curves 12 and 14, which can be transformed into the desired form of Equation 4 by that particular K.

Figure 1:
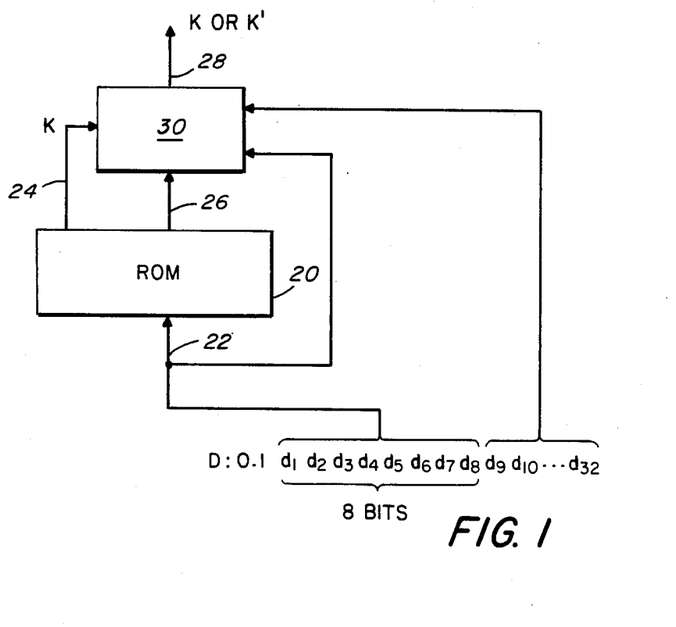
FIG. 1 is an overall block diagram of apparatus according to the invention for performing a range transformation.

The principal object of the invention is to find a method and apparatus for determining, given a normalized value D, the value K which can be used as the transform multiplication value. Referring to FIG. 1, one method for accomplishing this purpose is to provide a large read only memory 20 so that for any value of the input D, the memory 20 provides the value of K at its output. In a typical binary system having thirty-two bit words, however, the size of the ROM 20 is prohibitively large. As a result, it is desirable to limit the size of ROM 20 by both limiting the number of input bits over lines 22 which are examined, as well as limiting the precision of K on output lines 24. As will be described in more detail below, when the number of input bits of D over lines 22 is restricted, and correspondingly when the number of bits on the output lines 24 defining the precision of K is restricted, it is not possible to provide a correct mapping for all D to K. In other words, there will be instances where the multiplicative product of K and D (as provided by a size limited ROM) will not contain the requisite number "n" of leading ones as required by the division methods. In such an instance, however, it is possible to further provide an overflow or out-of-range indicator signal from ROM 20 over a line 26 which, in combination with the values of D and K, can be employed to modify the value of K, when necessary, to produce a modified value K' over output lines 28. The particular methods and apparatus employed to generate K' when an out-of-range condition is indicated by the signal over line 26 are described in more detail below.

Assume now that K has a precision of "p" bits after the binary point. Thus, the distance $d_1$ between successive discrete values of K equals $2^{-p}$. Since these discrete values of K will cover the entire range of D from one-half to one, if D has been normalized, and there is to be a discrete value of K for each value of D, the following equation must be satisfied:

$$1/(K + d_1) \geq (2^n - 1)/(K \cdot 2^n) \quad \text{(Equation 6)}$$

This is equivalent to stating that the value of D on curve 12 corresponding to a value of $K + d_1$ must be greater than the value of D on the curve 14 corresponding to a value of K. If this condition were not met, then the discrete values of K would not cover the entire range of D because there would be some value of D, if $d_1$ were chosen sufficiently large, for which no allowable discrete value of K would satisfy Equation 5. Equation 6 can be rewritten to provide an upper bound on $d_1$ as follows:

$$2^n \cdot K \geq K \cdot 2^n - K + d_1(2^n - 1) \qquad \text{(Equation 7)}$$
$$K \geq d_1(2^n - 1) \qquad \text{(Equation 8)}$$

or $$d_1 \leq \left(\frac{K}{2^n - 1}\right)_{min} \qquad \text{(Equation 9)}$$

which provides a minimum bound at $K=1$, so that $$d_1 \leq \frac{1}{2^n - 1} \qquad \text{(Equation 10)}$$

The bound of Equation 10 can be written even tighter as:

$$d_1 \leq \frac{1}{2^n} \qquad \text{(Equation 11)}$$

Thus, substituting the value of $d_1$ noted above, one has:

$$\frac{1}{2^p} \leq \frac{1}{2^n} \qquad \text{(Equation 12)}$$

or $$p \geq n \qquad \text{(Equation 13)}$$

Therefore, if it is necessary to provide a transformed denominator, D', having a string of "n" ones after the binary point, then K should have at least n bits after the binary point to provide the required transform multiplier value.

Since, referring again to FIG. 1, it is preferable to employ a table look-up, such as ROM 20, to generate the multiplier value, K, D must be uniformly divided in the interval one-half to one, and for each interval, a value of K must be assigned. This is equivalent to examining the "q" leading bits of the normalized divisor D at the input of ROM 20 over lines 22, and providing at the output of ROM 20 over lines 24, a value of K having "p" bits of precision. The question is then to determine what the minimum required value of "q" is and to then determine the number of bits p required for K.

Referring now to Equation 6, the upper bound on D for a transform multiplier value of $(K+d_1)$ is $(1/(K+d_1))$. This upper bound must be greater than the lower bound of D corresponding to a multiplier value of K. This means, taking into account that only a limited number of bits of D, the q most significant bits, are available for inspection, that the two bounds noted above must, for successive values of K, not only overlap, but overlap by an amount greater than a second bound $d_2$ which is defined as the interval between representative values of D. Thus, $$d_2 = 2^{-q} \qquad \text{(Equation 14)}$$

This required degree of overlap ensures that for every discrete value of D, q bits in precision, there will be a K so that $D \cdot K$ has "n" leading ones. Accordingly therefore, Equation 15 defines that degree of overlap as follows:

$$1/(K+d_1) - (2^n - 1)/(K \cdot 2^n) \geq d_2 \qquad \text{(Equation 15)}$$

$$(K \cdot 2^n - K \cdot 2^n + K - d_1(2^n - 1))/((K+d_1) \cdot K \cdot 2^n) \geq d_2 \qquad \text{(Equation 16)}$$

$$(K - d_1(2^n - 1))/(K \cdot (K+d_1) \cdot 2^n) \geq d_2 \qquad \text{(Equation 17)}$$

From Equation 17, given $d_1$ (defined in Equation 11) and "n", the maximum and minimum values of $d_2$ can be derived for the extreme values of K equal to 1 and 2.

Before examining the minimum number of bits required for K, given the number of bits q to be examined in D, it is important to note from Equation 17 that there is a trade-off, that is, as more bits are used to represent K, corresponding to a smaller value $d_1$, the bound on $d_2$ becomes larger and hence fewer bits of the denominator D need to be examined. This trade-off then provides a certain amount of flexibility.

Using Equation 11, the relationship between $d_1$ and n is substituted in Equation 17 with the result, neglecting the value $d_1$ in the expression $(K+d_1)$, that $d_2$ has an upper limit approximately equal to:

$$d_2 \simeq \frac{K-1}{K^2 \cdot 2^n} \qquad \text{(Equation 18)}$$

Then, for the minimum value of $K = 1 + 2^{-n}$, $$d_2 \approx 2^{-2n} \qquad \text{(Equation 19)}$$

and for $K = 2$ $$d_2 = 2^{-(n+2)} \qquad \text{(Equation 20)}$$

Thus $$(n+2) \geq q \geq 2n \qquad \text{(Equation 21)}$$

From Equation 21, then, it can be determined that to assure that a value of K will always be guaranteed, it is necessary to examine the first 2n bits of D to provide a transformed D (that is, D') having n leading ones, and use a multiplier K, having a precision, after the decimal point, of n bits. On the other hand, if q is greater than $(n+2)$ but less than 2n, then it will not always be possible to ensure that a K, determined by looking at only the leading q bits of D, will be the correct value. In some cases, the K calculated by using less than 2n bits will differ from the ideal, or desired value of K by plus or minus $d_1$, that is, by one least significant bit in K.

For example, when n equals seven, it has been determined that a q equal to nine (the minimum value of q) is satisfactory for approximately eighty percent of the 512 discrete values of D available when nine bits are employed. Thus, twenty percent of the cases were incorrect. Further, when q was increased to equal thirteen bits, the multiplier was properly determined for all values of D. However, the difference in ROM requirements when a look-up table is employed is significant. Thus, the ROM 20 for q equal to thirteen is sixteen times larger than the ROM needed for q equal to nine, that is, the number of input bits to the ROM for q equal to thirteen is four greater than the number of input bits when q equals nine.

One apparatus which can be employed for reducing the ROM size, when q equals nine and n and p both equal to seven, requires that the ROM provide an indicator bit whenever the K output may be incorrect for the particular D input. Further, when D is a normalized number, it is only necessary to examine eight bits (when q equals nine) since the initial bit after the decimal point will always be a one. Therefore, the ROM 20 which is needed to provide the transform multiplier value, K, is 256 words of seven-bit memory. However, it is desirable to join and use two 256-word memories of four bits each to provide at the output, not only the seven bits required for K, but in addition a single overflow or out-of-range indicator bit, for example on line 26 of FIG. 1, to indicate when an out-of-range (overflow or underflow) condition occurs.

Thus, referring to FIG. 1, eight bits of the normalized input D after the "1" following the decimal point, are applied to ROM 20 over lines 22. The output of the ROM over lines 24 is a predetermined value of the multiplier value ranging from $1+2^{-p}$ to 2, which, in this illustrated embodiment, may be incorrect by at most one least significant bit. If for a particular eight-bit input of D, remembering that these are the eight most significant bits of D following the initial one after the binary point, the output K over lines 24 is accurate, a selection circuitry 30 receives, for example, a "one" signal over line 26 and passes K to the output lines 28 adding the initial "one" after the binary point to set the multiplier K to its proper value. If on the other hand the value of K over lines 24 were inaccurate, depending upon the precise full value of D within the interval defined by the "q" bits of D, the selection circuitry 30 responds to a "zero" signal over lines 26 and performs the actual multiplication of the value K and, for example, the thirty-two bit actual value of D. Accordingly, therefore, if there is an out-of-range result, the circuitry 30 increments K to reduce it if the result of the multiplication is too high, or increments K positively if the actual multiplicative product of K and D is too low. The resulting multiplicative value K' is an output over lines 28.

By examining all of the incorrect cases for the example where q equals 9, and n and p equal 7, it has been found that the values of K and $K-d_1$ (for K (having p bits of precision) in the range between $(1+2^{-p})$ and 2), differ only in the least significant four bits. Therefore, by providing both an alternate four bits for the "incorrect cases", and a single selection bit to determine which group of four bits to select, all of the actual multiplication and testing during run-time can be eliminated. This is important since the multiplication is substantially expensive both in time and hardware. The generation of the selection bit (an out-of-range signal) can be effected as follows.

Figure 3:
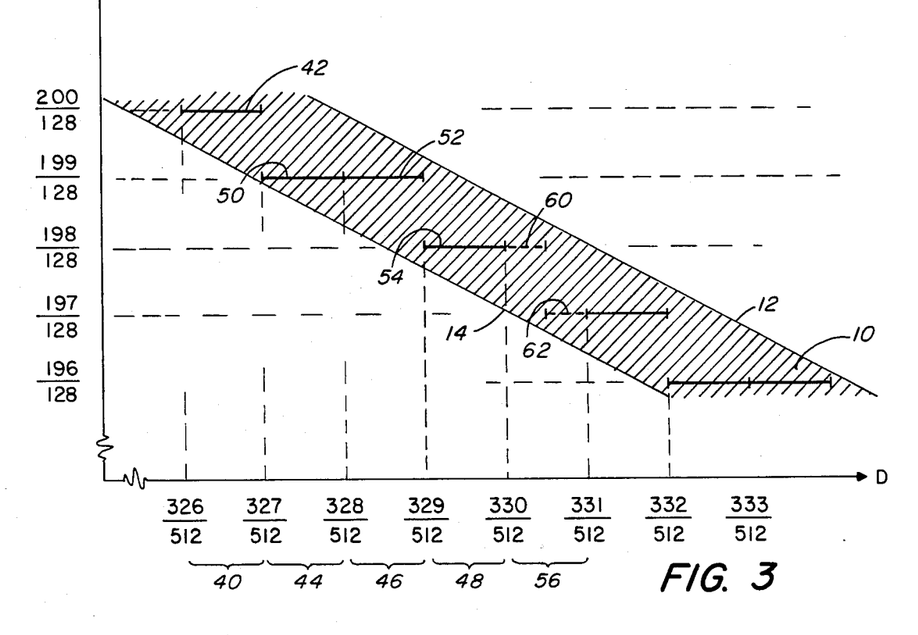
FIG. 3 is an enlarged portion of the diagram of FIG. 2 for a specific representative example illustrating the interval division location value according to the invention.
Figure 4:
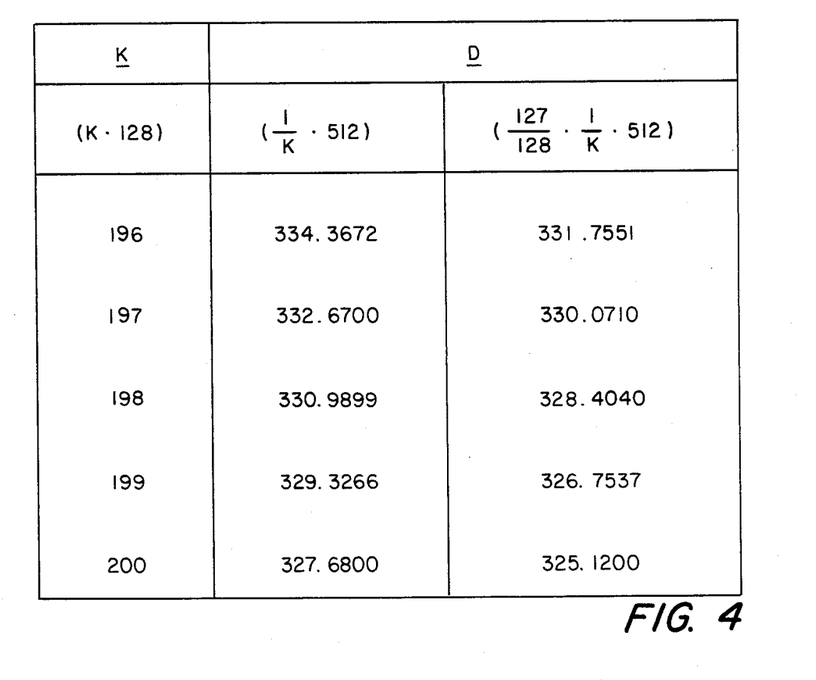
FIG. 4 is a table illustrating the bounds on the divisor D for specific multiplier values K according to one illustrated example of the invention.

Referring to FIG. 3, consider a detailed view of a portion of the graph of FIG. 2 where D has nine bits (q) and K has seven bits (p). The portion of the graph which is illustrated is that portion wherein D varies from 326/512 to 333/512 and where K varies from 196/128 to 200/128. The table of FIG. 4 provides a numerical tabulation of the values of the limits or bounds on D, wherein, for a given K, Equation 5 is satisfied. For convenience, the tabulation is provided in terms of 1/512ths.

It will be recalled, with respect to FIG. 2, that within the cross-hatched area 10, a point satisfies Equation 5 and specifies both a value of K and D so that the transformed divisor D', has "n" leading ones. Therefore, referring to FIG. 3, for each value of D between 326/512 and 327/512, denoted as interval 40, there exists in the cross-hatched area, one of the discrete values of K, that is, K=200/128, for which each combination of (D,K) falls within the cross-hatched area. The locus of these points is indicated by the horizontal line segment 42. Similarly, for the ranges of D in the intervals between 327/512 and 328/512, 328/512 and 329/512, and 329/512 and 330/512, intervals 44, 46, and 48 respectively, there exist discrete values of K corresponding to values 199/128, 199/128, and 198/128, respectively, for which Equation 5 is satisfied. The loci of these points are indicated by line segments 50, 52, and 54 respectively.

However, in an interval 56 wherein when D ranges from 330/512 to 331/512, the selected value of K depends upon the actual value of D, that is, K should equal 198/128 or 197/128 depending upon D. While there is clearly a subinterval within the interval 56 where K can equal either of those values, as one approaches the value of D equal to 330/512, K must equal 198/128 and in that portion of the interval 56 wherein D approaches 331/512, K must equal 197/128 in order to remain within the range defined by Equation 5 and illustrated as the cross-hatched area of FIGS. 2 and 3. Thus, for interval 56, it is necessary to examine additional bits of D to determine which value of K to select. It is therefore here that the extra bit from ROM 20 over line 26 is necessary to indicate an out-of-range condition wherein, for example, the product of K and D can be calculated and, if greater than one (for the embodiment wherein D is to have "n" leading ones) an alternate value of K can be selected. For example, a value of K equal to 198/128 can be assigned to interval 56 and, if there is an overflow or out-of-range condition, K can be decremented by 1/128 and the new multiplier value (equal to $K-d_1$) employed. It is this function which the hardware of FIG. 1 can implement.

As noted above, it is clearly more desirable, however, to select a hardware embodiment wherein multiplication is not employed. In connection with this particular example, it is clear that by examining only one additional bit in D, that is, bit $d_9$, a decision regarding the value of K can be made for the interval 56. Thus, if the value of D is in the first half of the interval [330/512, 331/512], then K is assigned a value 198/128 and if D is in the second half of the interval, K is assigned a value equal to 197/128. This is illustrated by the dotted line segments 60, 62 of FIG. 3.

An examination of those intervals for the entire range of D from one-half to one and for which a single value of K cannot be assigned, indicates that it is necessary to examine a maximum of four extra bits of D (bits $d_9$, $d_{10}$, $d_{11}$, $d_{12}$) to provide interval division locations equal to 0.0625 (1/16), 0.25 (¼), 0.375 (3/8), 0.5 (½), and 0.75 (¾). That is, there are five distinct division points which define, for each ambiguous interval, the division location for determining the value of K associated with the two resulting subintervals defined by the division point.

Thus, by widening the input to the ROM 20, one can provide not only a predicted value of K, but in addition an interval division location. This division point or interval division location information can be encoded into, in this example, three bits to cover each of the five possible cases. Thus, a practical hardware implementation, requires that the next four bits of D, (bits $d_9$, $d_{10}$, $d_{11}$, and $d_{12}$) (the smallest division interval for this example is 1/16 of the full interval) be examined and compared with the interval division location information to generate an out-of-range indication which can then define and effect processing of the correct value of K. If an out-of-range condition is indicated, then the value of K can be incremented in its least significant bit(s) to determine the correct value of K.

Figure 5:
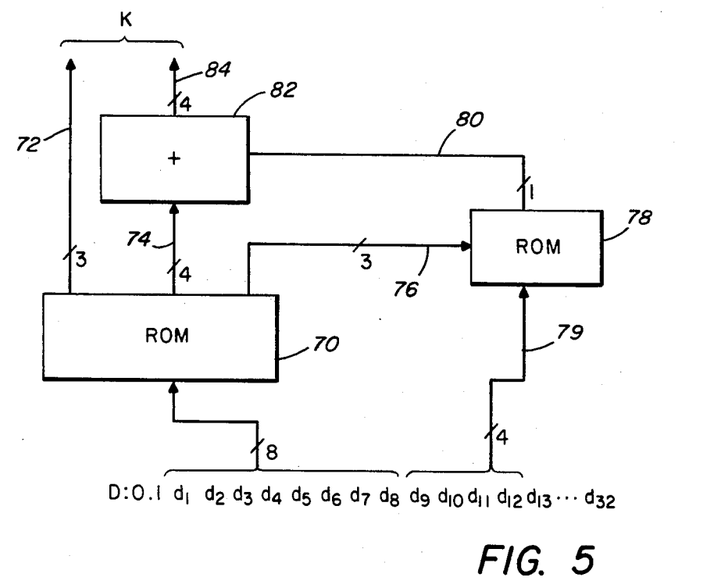
FIG. 5 is an electrical block diagram showing one particular embodiment according to the invention.

Referring now to FIG. 5, it has, for the particular example described in connection with FIG. 3, been determined that the change in K occurs only in its low order bits. Thus, for this illustrated example, the three high order bits do not change, and it is only necessary to increment the lower order bits. A ROM 70 receives at its input eight bits of the denominator D and provides a ten bit output, seven bits associated with K and three bits associated with the interval division location. The seven bits associated with K are divided in this illustrated embodiment between the three most significant bits available over lines 72 and the four least significant bits available over lines 74. The three interval division location bits are available over lines 76. A second ROM 78, having seven input bits and one output bit, receives the interval location bits over lines 76 and the next four least significant bits of the divisor over lines 79. (ROM 78 can in many instances be replaced by a decode logic, depending upon the numbers of input and output bits, to achieve a faster response time.) These seven bits define, in ROM, the out-of-range indicator signal which is available at the output of the ROM over a line 80. The output over line 80 controls an incrementing adder 82 to determine when the least significant input bits of K should be incremented by one. The four-bit output of the adder 82 in combination with the three most significant bits over lines 72 define the correct value of K. (The bit to the left of the binary point, a "one", can be added later.)

Figure 6:
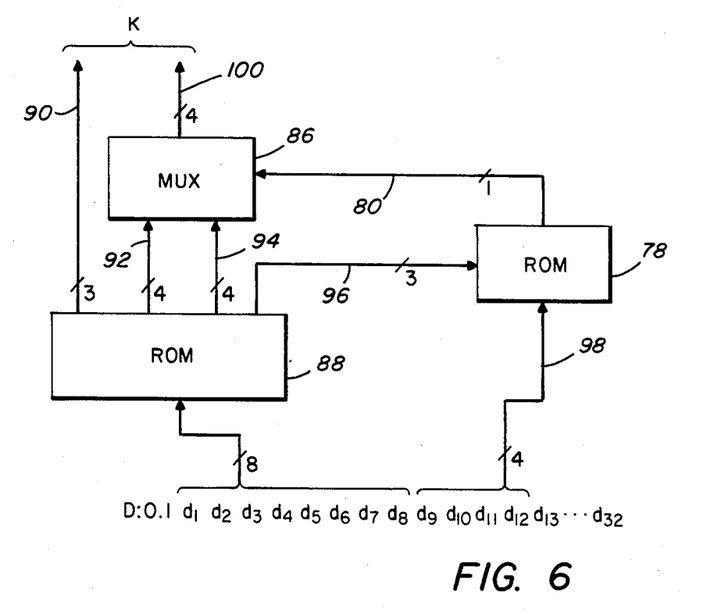
FIG. 6 is an electrical block diagram showing a second particular embodiment in accordance with the invention.

Referring now to FIG. 6, in yet another particular embodiment of the invention, the adder 82 can be eliminated in favor of a multiplexing or selection element 86. In this embodiment, a ROM 88, now fourteen bits wide at its output, receives the same eight input bits of the divisor D and provides, for this illustrated embodiment, the three most significant bits of K over lines 90, the four least significant bits of the expected K over lines 92, the incremented new value of K should an out-of-range condition occur, comprising four bits over lines 94, and the interval division defining bits over lines 96. The second ROM 78, operating as in FIG. 5, receives the interval division location information over lines 96 and the four lesser significant bits (bits $d_9$, $d_{10}$, $d_{11}$, $d_{12}$) of the divisor D over lines 98. The one-bit output of ROM 78, over line 80, controls the multiplexing element 86 to select either available output over lines 92 or over lines 94. The output of the multiplexing element 86 over lines 100 is the correct four least significant bits of K and the combination of that output and the data bits over lines 90 generates the proper value of K. (As above, the bit to the left of the binary point, a "one", can be added later.)

As noted above, each of the embodiments of FIGS. 5 and 6 employ the lesser significant bits of the divisor D. This requirement is imposed primarily as the normalized value of D approaches "one" in value, because, referring to FIG. 2, this is where the slopes of the two curves 12 and 14 approach their minimum magnitudes and hence provide the least overlap. In addition, in other examples, more or fewer bits can be employed for defining K and more or fewer bits of D can be examined. Further, in the implementation of the embodiments of FIGS. 5 and 6, more or fewer of the lesser significant bits of D and K may be required to properly define the out-of-range condition indicator signal.

The same method and apparatus can be employed in connection with obtaining, using the described method, a denominator which has the form of a one followed by a binary point and "n" zeros. In such an instance, the apparatus would be identical except that the values of K will change to account for the difference of value to which the denominator is converging.

Additions, subtractions, deletions, and other modifications of the described particular embodiments will be apparent to those practiced in the art and are within the scope of the following claims.

What is claimed is:

1. A range transformation method for transforming a divisor D of a division calculation having a normalized representation and having an allowable range to a range transformed value X where the magnitude of $(X-1)$ is less than $2^{-n}$ where n is the number of ones following the decimal point when X has the form 0.111—1 and where n is the number of zeros following the decimal point when X has the form 1.000—0, said method comprising the steps of generating at least one transform multiplier value K from a first high order "q" digits of D, generating an out-of-range indicator signal from at least said "q" digits of D, and modifying said multiplier value K in response to said out-of-range indicator signal when an out-of-range condition is indicated.

2. The range transformation method of claim 1 further comprising the step of employing a look-up table for generating said transform multiplier value K, K having a precision of "p" bits, where "q" satisfies the equation $$(n+2) \leq q \leq 2n;$$

and where $p = n$.

3. The range transformation method of claim 1 further comprising the steps of employing a first look-up table for generating said transform multiplier value K in response to said at least q digits of said divisor D, employing a second look-up table responsive to said at least q digits of said divisor D, for generating said out-of-range indicator signal, and changing the value of K by a selected predetermined incremental amount whenever the out-of-range indicator signal indicates an out-of-range condition.

4. The range transformation method of claim 3 wherein said changing step comprises the steps of multiplying said transform multiplier value K and said divisor D for forming a multiplicative product, and incrementing said multiplier value K in its least significant digits when said multiplicative product differs from "one" by an amount greater than $2^{-n}$.

5. The range transformation of claim 4 wherein said incrementing step comprises the step of lowering the value of K in its least significant digits.

6. The range transformation method of claim 3 wherein said second employing step comprises the steps of generating an interval division location for dividing at least one of a plurality of equal intervals covering the allowable range of the divisor into smaller subintervals, and responding to said interval division location and a plurality of less significant digits of said divisor D for generating said out-of-range indicator signal.

7. The range transformation method of claim 6 wherein said changing step comprises the step of adding an increment to said generated transform multiplier in response to said out-of-range indicator signal for preventing an out-of-range condition.

8. The range transformation method of claim 6 wherein said changing step further comprises the steps of using a look-up table means for generating, in response to said high order "q" bits of the divisor D, a second value of the transform multiplier K differing only in a discrete amount, the "y" low order bits of K, from said first generated transform multiplier value, and using said out-of-range indicator signal for selecting between said first and second generated values of K.

9. Apparatus for effecting a range transformation of a divisor D of a division calculation having a normalized representation and having an allowable range to a range transformed value X where the magnitude of $(X-1)$ is less than $2^{-n}$ where n is the number of ones following the decimal point when X has the form 0.111—1 and where n is the number of zeros following the decimal point when X has the form 1.000—0, said apparatus comprising means for generating at least one transform multiplier value K from a first, high order "q" digits of D, means for generating an out-of-range indicator signal from at least said first, high order "q" digits of D, and means for modifying said generated transform multiplier value K, in response to said out-of-range indicator signal when an out-of-range condition is indicated.

10. The range transformation apparatus of claim 9 further wherein said first and second generating means comprise a memory element for storing a look-up table for generating said transform multiplier value K, K having a precision of "p" bits, wherein "q" satisfies the equation $$(n+2) \leq q \leq 2n;$$

and where p=n.

11. The range transformation apparatus of claim 9 wherein said first and second generating means further comprise memory means for storing a first look-up table for generating said transform multiplier value K in response to said at least "q" digits of said divisor D, and said memory means being further responsive to said at least "q" digits of said divisor D for storing a second look-up table for generating said out-of-range indicator signal, and wherein said modifying means comprises means for changing the value of K by a selected predetermined incremental quantity whenever an out-of-range condition is indicated by said indicator signal.

12. The range transformation apparatus of claim 11 wherein said changing means comprises means for multiplying said generated transform multiplier value K and said divisor D for forming a multiplicative product, and means for incrementing said generated value "K" in its least significant digits when said multiplicative product is out of a predetermined transform range.

13. The range transformation apparatus of claim 12 wherein said incrementing means comprises means for lowering the value of K in its least significant digits.

14. The range transformation apparatus of claim 11 wherein said second generating means comprises means for generating an interval division location signal for indicating the division of at least one of a plurality of equal intervals covering the allowable range of the divisor D into smaller subintervals, and means for responding to said interval division location signal and a plurality of less significant digits of said divisor D for generating said out-of-range indicator signal.

15. The range transformation apparatus of claim 14 wherein said changing means comprises means for adding an increment to said generated transform multiplier value in response to said range indicator signal for preventing an out-of-range condition.

16. The range transformation apparatus of claim 14 wherein said changing means further comprises means for storing a look-up table for generating in response to the high order "q" bits of the divisor D, a second value of K differing only in a discrete amount, the "y" low order bits of K, from said first generated transform multiplier value, and means for using said out-of-range indicator signal for selecting between said first and second generated values of K.

17. Range transformation apparatus as defined in claim 9 wherein said first generating means comprises means for storing a first look-up table for generating said transform multiplier value K in response to said at least "q" digits of said divisor D, said second generating means comprises means further responsive to said at least "q" digits of said divisor D for storing a second look-up table for generating said out-of-range indicator signal, and said modifying means comprises means for changing the value of K by a selected predetermined incremental quantity when an out-of-range condition is indicated by said indicator signal.

18. Range transformation apparatus as defined in claim 17 wherein said changing means comprises means for multiplying said generated transform multiplier value K and said divisor D for forming a multiplicative product, and means for incrementing said generated value K in its least significant digits when said multiplicative product is out of a predetermined transform range.

19. Range transformation apparatus as defined in claim 9 wherein said second generating means comprises means for generating an interval division location signal for indicating the division of at least one of a plurality of equal intervals covering the allowable range of the divisor D into smaller subintervals, and means for responding to said interval division location signal and a plurality of less significant digits of said divisor D for generating said out-of-range indicator signal.

20. Range transformation apparatus as defined in claim 19 wherein said modifying means comprises means for adding an increment to said generated transform multiplier value in response to said range indicator signal for preventing an out-of-range condition.

21. Range transformation apparatus as defined in claim 19 wherein said modifying means further comprises means for storing a look-up table for generating in response to the high order "q" bits of the divisor D, a second value of K differing only in a discrete amount, the "y" low order bits of K, from said first generated transform multiplier value, and means for using said out-of-range indicator signal for selecting between said first and second generated values of K.

22. Apparatus for effecting a range transformation of a divisor D of a division calculation, the divisor having a normalized representation, to a range transformed value X, where the magnitude of $(X-1)$ is less than $2^{-n}$ where n is the number of ones following the decimal point when X has the form 0.111—1 and where n is the number of zeros following the decimal point when X has the form 1.000—0, said apparatus comprising read-only-memory means for generating at least one transform multiplier value K from a first high order "q" digits of D, K having a precision of "p" bits, said read-only-memory means further including means for generating an out-of-range indicator signal from said at least first, high order "q" digits of D, means for modifying said generated transform multiplier value K in response to said out-of-range indicator signal when an out-of-range condition is indicated, by selecting a value K which is different than said generated value K by a selected predetermined incremental quantity, said modifying means further being responsive to a plurality of lower order digits of said divisor for generating a selection signal for selecting between the generated multiplier value K and the value K, and wherein "q" satisfies the equation $(n+2) \leq q \leq 2n$ and $p=n$.

* * * * *